(12) United States Patent
Roman et al.

(10) Patent No.: US 6,803,931 B1
(45) Date of Patent: Oct. 12, 2004

(54) GRAPHICAL USER INTERFACE INCLUDING ZOOM CONTROL BOX REPRESENTING IMAGE AND MAGNIFICATION OF DISPLAYED IMAGE

(75) Inventors: Kendyl A. Roman, 730 Bantry Ct., Sunnyvale, CA (US) 94087; R. Paul Raposo, San Francisco, CA (US); Todd K. Sprague, Rancho Cordova, CA (US); Ben Waidhofer, Antelope, CA (US)

(73) Assignee: Kendyl A. Roman, Sunnyvale, CA (US)

(*) Notice: Subject to any disclaimer, the term of this patent is extended or adjusted under 35 U.S.C. 154(b) by 0 days.

(21) Appl. No.: 09/433,978

(22) Filed: Nov. 4, 1999

(51) Int. Cl.[7] .................................................. G09G 5/00
(52) U.S. Cl. ..................... 345/800; 345/784; 345/661; 382/298
(58) Field of Search ................................ 345/784, 785, 345/786, 787, 800–801, 660–661, 670, 671; 382/246, 247, 248, 298–299

(56) References Cited

U.S. PATENT DOCUMENTS

| | | | |
|---|---|---|---|
| 4,301,469 A | 11/1981 | Modeen et al. ................ 358/75 |
| 4,302,775 A | 11/1981 | Widergren et al. .......... 358/136 |
| 4,385,363 A | 5/1983 | Widergren et al. .......... 364/725 |
| 4,394,774 A | 7/1983 | Widergren et al. ............ 382/56 |
| 4,410,916 A | 10/1983 | Pratt et al. ................... 358/263 |
| 4,546,385 A | 10/1985 | Anastassiou ................. 358/133 |
| 4,646,356 A | 2/1987 | Anderson et al. .............. 382/56 |
| 4,698,672 A | 10/1987 | Chen et al. ................... 358/136 |
| 4,704,628 A | 11/1987 | Chen et al. ................... 358/136 |
| 4,743,959 A | 5/1988 | Frederiksen .................. 358/11 |
| 5,014,710 A | 5/1991 | Maslak et al. ........... 128/660.05 |
| 5,047,853 A | 9/1991 | Hoffert et al. ................ 358/133 |
| 5,309,232 A | 5/1994 | Hartung et al. .............. 348/384 |
| 5,416,602 A | 5/1995 | Inga et al. .................... 358/403 |
| 5,471,989 A | 12/1995 | Roundhill et al. ...... 128/660.04 |
| 5,552,832 A | 9/1996 | Astle ............................ 348/420 |
| 5,581,613 A | 12/1996 | Nagashima et al. ......... 380/201 |
| 5,621,660 A | 4/1997 | Chaddha et al. ............. 364/514 |

(List continued on next page.)

FOREIGN PATENT DOCUMENTS

WO  WO 99/59472  11/1999  ............ A61B/8/00

OTHER PUBLICATIONS

Adobe Photoshop 5.0, May 1998, Help—using the navigator palette: To move the view of an image using the navigator palette. Exhibit 1 and page 1.
Acrobat Reader 4.0, Oct. 21, 1999, Help pp. 25, 42 and 43.

*Primary Examiner*—Ba Huynh

(57) ABSTRACT

A graphical user interface (GUI) graphically corresponds to an image display window through which a single image or a stream of images or video frames are displayed. The GUI includes a zoom control box having an inner region positioned within an outer region. The size of the inner region relative to the outer region represents the magnification of the portion of the image being displayed within the image display window. The magnification of the image being displayed is increased by using a cursor control device to position a cursor within the inner region and clicking the cursor control device. The magnification of the image being displayed is decreased by using the cursor control device to position the cursor outside of the inner region but inside of the outer region and clicking the cursor control device. As the magnification is increased or decreased, the size of the inner region relative to the outer region is changed accordingly. A magnification factor is also displayed within the inner region to display a numeric representation of the current magnification. The position of the inner region within the outer region represents the portion of the entire image being displayed within the image display window. The portion of the image being displayed within the image display window is changed by clicking and dragging the inner region to the desired position within the outer region using the cursor control device.

21 Claims, 2 Drawing Sheets

U.S. PATENT DOCUMENTS

| | | | |
|---|---|---|---|
| 5,646,618 A | 7/1997 | Walsh | 341/67 |
| 5,715,823 A | 2/1998 | Wood et al. | 128/660.01 |
| 5,812,119 A | 9/1998 | Tateyama | 345/202 |
| 5,812,788 A | 9/1998 | Agarwal | 395/200.77 |
| 5,999,655 A | 12/1999 | Kalker et al. | 382/234 |
| 6,054,990 A * | 4/2000 | Tran | 345/863 |
| 6,063,032 A * | 5/2000 | Grunwald | 600/440 |
| 6,064,324 A | 5/2000 | Shimizu et al. | 341/50 |
| 6,078,691 A | 6/2000 | Luttmer | 382/235 |
| 6,115,485 A | 9/2000 | Dumoulin et al. | 382/128 |
| 6,181,711 B1 | 1/2001 | Zhang et al. | 370/468 |
| 6,219,358 B1 | 4/2001 | Pinder et al. | 370/537 |
| 6,335,990 B1 | 1/2002 | Chen et al. | 382/261 |
| 6,339,616 B1 | 1/2002 | Kovalev | 375/240.16 |
| 6,384,862 B1 | 5/2002 | Brusewitz et al. | 348/212 |
| 2001/0021260 A1 | 9/2001 | Chung et al. | 382/100 |

* cited by examiner

GRAPHICAL USER INTERFACE INCLUDING ZOOM CONTROL BOX REPRESENTING IMAGE AND MAGNIFICATION OF DISPLAYED IMAGE

FIELD OF THE INVENTION

The present invention relates to the field of computers and image display devices having graphically-oriented user interfaces. More particularly, the present invention relates to the field of computers and image display devices having graphically-oriented user interfaces through which the display of an image is graphically controlled.

BACKGROUND OF THE INVENTION

Image display devices are used to display both still images and moving video images, which are generated by or stored locally within the image display device or received from an external source device. A still or video frame image will herein be referred to collectively as an image. Typically, the image display device displays the image or series of images within an image display window, which takes up either all or a portion of the display area of the image display device. An image display device can include one or more image display windows in which images are displayed.

Image display devices include both televisions and personal computer (PC) monitors. Existing televisions and PC monitors are different. Televisions generally have a medium display resolution capability and several analog interfaces for receiving input signals, such as a composite video interface, an s-video interface, and a radio frequency interface for radio frequency signals received over coaxial cable. Although, televisions are advancing in their ability to display increasingly higher resolutions of video and graphic data, consumer video resolution has changed little over time. While the picture tube of PC monitors is based on consumer television technology, PC monitors or displays have different resolution requirements than consumer televisions, due to the need for PC monitors to have the ability to display legible small text and fine lines for detailed work. To meet this need, PC monitors have a higher resolution than consumer televisions and very different high bandwidth interfaces, such as Video Graphics Array (VGA), Super VGA (SVGA) and RGB. In most modern computer systems an operating system provides a graphical interface for the computer user. The user can run application programs, manipulate files, and perform most other necessary functions through this graphical interface by manipulating images on the computer's display. This manipulation is accomplished by using cursor control keys and other keyboard keys or by using a cursor controlling peripheral device such as a joystick, mouse or trackball.

A schematic block diagram of a typical configuration including an external image source 10 and a host computer system 20 is illustrated in FIG. 1. The external image source 10 is coupled to an interface port 28 of the computer system 20 by a bus or cable for transmitting image or video data to the computer system 20 for display. The host computer system 20, illustrated in FIG. 1, is exemplary only and includes a central processor unit (CPU) 42, a main memory 30, a video display adapter 22 such as a graphics adapter (VGA) card, a mass storage device 32 and an interface circuit 28, all coupled together by a conventional bidirectional system bus 34. The mass storage device 32 may include both fixed and removable media using any one or more of magnetic, optical or magneto-optical storage technology or any other available mass storage technology. The system bus 34 contains an address bus for addressing any portion of the memory 30. The system bus 34 also includes a data bus for transferring data between and among the CPU 42, the main memory 30, the display adapter 22, the mass storage device 32 and the interface circuit 28.

The host computer system 20 is also coupled to a number of peripheral input and output devices including the keyboard 38, the mouse 40 and the associated display 36. The keyboard 38 is coupled to the computer system via a keyboard/mouse interface 46 for allowing a user to input data and control commands into the computer system 20. A conventional mouse 40 is coupled to the keyboard 38 for manipulating graphic images on the display 36 as a cursor control device. Alternatively, as is known in the art, the mouse 40 is coupled directly to the computer system 20 through a serial port.

The display adapter 22 interfaces between the components within the computer system 20 and the display 36. The display adapter 22 converts data received from the components within the computer system 20 into signals which are used by the display 36 to generate images for display in one or more image display windows.

To control the display of a single image or a stream of images, such as a video stream, on an image display device, such as the display 36, a user typically has to manually change control parameters of the image display device or particular image display window, such as resolution or magnification, either on the display device 36, or within the application program providing the image to be displayed or operating the image display window. Another conventional method of changing parameters such as resolution or magnification is to use zoom control features to zoom in or zoom out on the image itself. However, when using such zoom control features, and the image is magnified to be bigger than the display window, the user then also has to use separate positional controls on the edge of the display window to display different portions of the image. There is currently a lack of image display devices which allow easy control of display parameters such as zoom and magnification to control the display of an image within an image display window.

SUMMARY OF THE INVENTION

A graphical user interface (GUI) graphically corresponds to an image display window through which a single image or a stream of images or video frames are displayed. The GUI includes a zoom control box having an inner region positioned within an outer region. The inner region and outer region could be rectangular, oval, or other shape. The size of the inner region relative to the outer region represents the magnification of the portion of the image being displayed within the image display window. The magnification of the image being displayed is increased by using a cursor control device to position a cursor within the inner region and clicking the cursor control device. The magnification of the image being displayed is decreased by using the cursor control device to position the cursor outside of the inner rectangle region but inside of the outer rectangle region and clicking the cursor control device. As the magnification is increased or decreased, the size of the inner region relative to the outer region is changed accordingly. A magnification factor is also displayed within the inner region to display a numeric representation of the current magnification. The position of the inner region within the outer region represents the portion of the entire image being displayed within the image display window. The portion of the image being displayed within the image display window is changed by clicking and dragging the inner region to the desired position within the outer region using the cursor control device.

In one aspect of the present invention, a graphical user interface for controlling magnification of and portion of an original image displayed within an image display window includes an outer region representing the original image and an inner region positioned within the outer region, wherein a size of the inner region relative to the outer region represents the magnification of the original image being displayed within the image display window. A position of the inner region within the outer region represents the portion of the original image being displayed within the image display window. The size and position of the inner region relative to the outer region is changed in response to input commands. The size of the inner region is decreased when an input command is entered selecting the inner region. The size of the inner region is increased when an input command is entered selecting the outer region. The graphical user interface is preferably displayed on a computer system having a display, a memory, and an input device. The input commands are entered using the input device and the inner and outer regions are selected by positioning a cursor within an appropriate region and clicking the input device. The input device is preferably a mouse. The graphical user interface further includes a magnification factor displayed within the inner region which numerically represents the magnification of the original image being displayed within the image display window.

In another aspect of the present invention, a graphical user interface for controlling magnification of, and portion of, an original image displayed within an image display window includes an outer region representing the original image and an inner region positioned within the outer region, wherein a position of the inner region within the outer region represents the portion of the original image being displayed within the image display window. A size of the inner region relative to the outer region represents the magnification of the original image being displayed within the image display window. The graphical user interface further comprises a magnification factor displayed within the inner region which numerically represents the magnification of the original image being displayed within the image display window.

In yet another aspect of the present invention, a method of controlling magnification of, and portion of, an original image displayed within an image display window includes the steps of displaying a zoom control box including an inner region positioned within an outer region, wherein a size of the inner region relative to the outer region represents the magnification of the original image being displayed within the image display window and further wherein a position of the inner region within the outer region represents the portion of the original image being displayed within the image display window and changing the size and position of the inner region in response to input commands. The size of the inner region is decreased when an input command is entered selecting the inner region. The size of the inner region is increased when an input command is entered selecting the outer region. The input commands are entered using a cursor control device and the inner and outer regions are selected by positioning a cursor within an appropriate region and clicking the cursor control device. The method further includes the step of displaying the portion of the original image within the image display window. The steps of displaying are all preferably completed on a display of a computer system, wherein the computer system includes the display, a memory and an input device. The input device is preferably a mouse. The method further includes the step of displaying a magnification factor within the inner region numerically representing the magnification of the original image being displayed within the image display window. The method further includes the step of receiving the original image from an image source. The original image is a still image or a frame within a video stream.

In still yet another aspect of the present invention, in a computer system having a display, a memory and an input device, a graphical user interface for controlling magnification of, and portion of, an original image displayed within an image display window includes an outer region representing the original image and an inner region positioned within the outer region, wherein a size of the inner region relative to the outer region represents the magnification of the original image being displayed within the image display window and further wherein a position of the inner region within the outer region represents the portion of the original image being displayed within the image display window. The graphical user interface further includes a magnification factor displayed within the inner region which numerically represents the magnification of the original image being displayed within the image display window. The size and position of the inner region relative to the outer region is changed in response to input commands from the input device. The size of the inner region is decreased and the magnification factor is increased when an input command is entered selecting the inner region and further wherein the size of the inner is increased and the magnification factor is decreased when an input command is entered selecting the outer region. The inner and outer regions are selected by positioning a cursor within an appropriate region and clicking the input device. The input device is preferably a mouse. The computer system is further configured to receive the original image from an image source. The original image is a selective one of a still image and a frame within a video stream.

DETAILED DESCRIPTION OF THE PREFERRED EMBODIMENT

Figure 1:
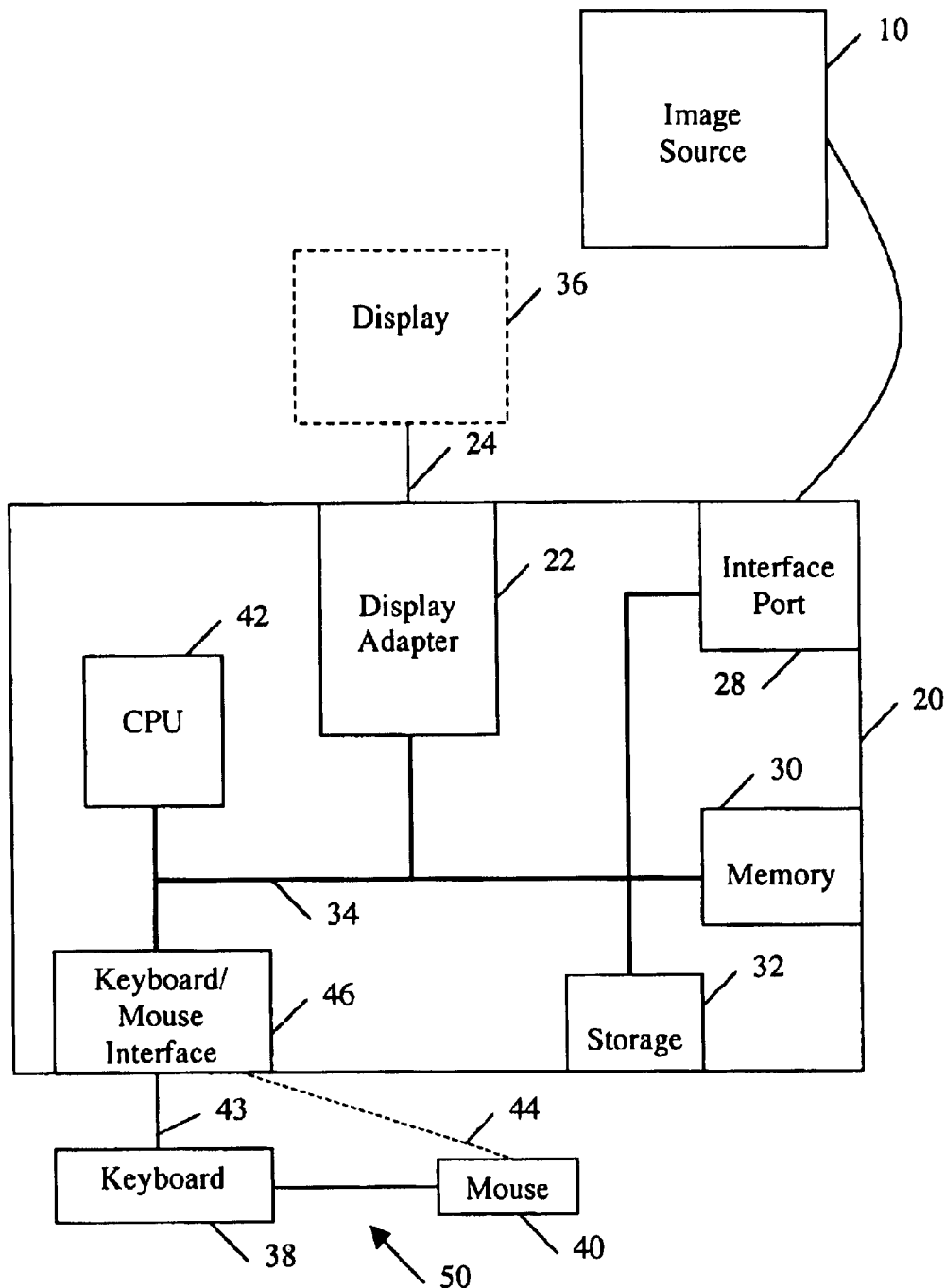
FIG. 1 illustrates a schematic block diagram of a configuration including a host computer system and an external image source.

A graphical user interface (GUI) graphically corresponds to an image display window 110 through which a single image or a stream of images or video frames are displayed. The GUI and the image display window 110 are displayed on a display device such as a display device 36 of a computer system 20, illustrated in FIG. 1. Alternatively, the GUI and the image display window 110 are displayed on and controlled by any one or more appropriate devices. The GUI includes a zoom control box 100 having an inner region 102 positioned within an outer region 106.

A user controls aspects and changes parameters of the image displayed within the image display window 110 using a cursor control device 50, such as a keyboard 38 or mouse 40, of the computer system 20 illustrated in FIG. 1 to enter input commands within the zoom control box 100 by selecting appropriate regions of the zoom control box 100. The cursor control device can be a mouse, keypad, trackball, touch pad, remote control or other device, depending on the configuration of the host system. Further, the cursor control device can be wired or wireless using radio, infrared or any other appropriate technology.

The size of the inner region 102 relative to the outer region 106 represents the magnification of the portion of the image being displayed within the image display window 110. A magnification factor 104 representing the current magnification of the image being displayed within the image display window 110 from the original image is displayed within the inner region 102. The magnification of the image being displayed is increased by using a cursor control device 50 to position a cursor within the inner region 102 and clicking the cursor control device 50. As the magnification is thus increased, the size of the inner region 102 is decreased appropriately relative to the outer region 106 and the magnification factor 104 is appropriately incremented. The magnification of the image being displayed is decreased by using the cursor control device 50 to position the cursor outside of the inner region but inside of the outer region and clicking the cursor control device. As the magnification is thus decreased, the size of the inner region 102 is increased appropriately relative to the outer region 106 and the magnification factor 104 isappropriately decremented.

The position of the inner region 102 within the outer region 106 represents the portion of the entire original image being displayed within the image display window 110. The portion of the image being displayed within the image display window 110 is changed by clicking and dragging the inner region 102 to the desired position within the outer region 106 using the cursor control device 50. As the position of the inner region 102 changes within the outer region 106, the portion of the image displayed within the image display window 110 changes appropriately.

Figure 2:
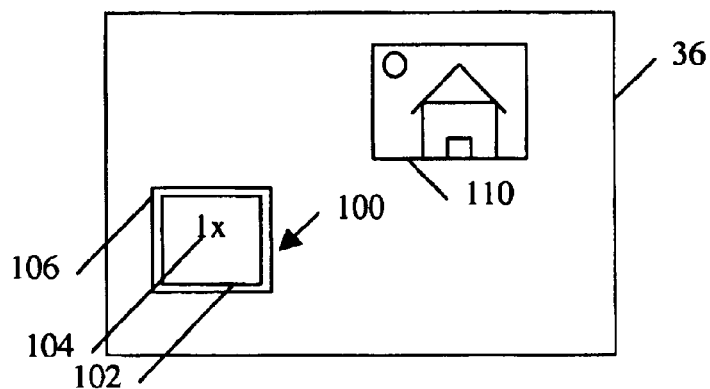
FIG. 2 illustrates an example of the image display window and a zoom control box of the present invention in a default or original state with a magnification factor of 1×.
Figure 3:
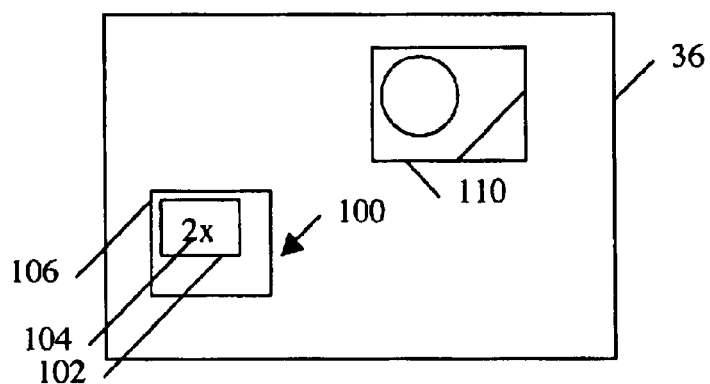
FIG. 3 illustrates an example of the image display window and a zoom control box of the present invention with a magnification factor of 2× and positioned to display the top left-hand corner portion of the original image.
Figure 4:
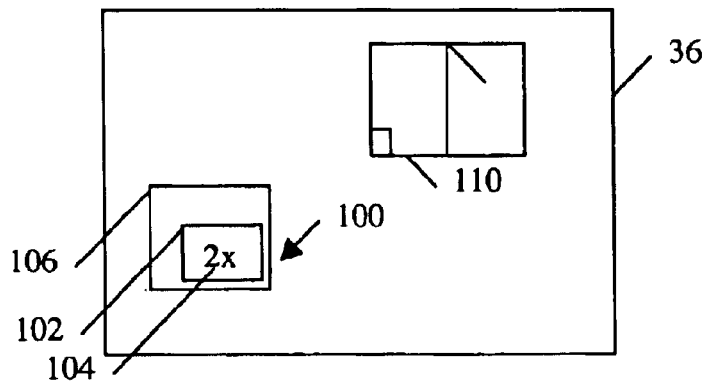
FIG. 4 illustrates an example of the image display window and a zoom control box of the present invention with a magnification factor of 2× and positioned to display the bottom right-hand corner portion of the original image.

The display 36 including the image display window 110 and a graphical user interface including the zoom control box 100, according to the present invention, is illustrated in FIGS. 2–4. The zoom control box 100 of the present invention preferably includes two regions 102 and 106. The outer region 106 forms the outer edge of the zoom control box 100 and represents the entire available original image. The inner region 102, is included and positioned within the outer region 106 and represents a region of interest of the original image currently being displayed within the image display window 110. Within the inner region 102, a magnification factor 104 is displayed, representing the current magnification being applied to the image displayed within the image display window 110.

The magnification factor 104 is changed by using a cursor control device 50 to select an appropriate region within the zoom control box 100. A user zooms in on a specific portion of the image to increase the magnification factor 104 by using the cursor control device 50 to position the cursor within the inner region 102 of the zoom control box 100 and clicking the cursor control device 50. When the user positions the cursor within the inner region 102 of the zoom control box 100 and clicks the cursor control device 50, the inner region 102 becomes appropriately smaller in size and the magnification factor 104 is incremented. By clicking the cursor control device when the cursor is positioned within the inner region 102 a number of times, the inner region 102 becomes continually smaller in size and the magnification factor 104 is incremented a number of times equal to the number of times that the cursor control device is clicked.

A user zooms out on a specific portion of the image to decrease the magnification factor 104 by using the cursor control device 50 to position the cursor within the outer region 106, but outside of the inner rectangle region 102, and clicking the cursor control device 50. When the user positions the cursor within the outer rectangle region 106, but outside of the inner rectangle region 102 and clicks the cursor control device 50, the inner rectangle region 102 becomes appropriately larger in size and the magnification factor 104 is decremented. By positioning the cursor outside of the inner region 102, but within the outer region 106, and clicking the cursor control device 50 a number of times, the inner rectangle region 102 becomes increasingly larger with each click and the magnification factor 104 is decremented a number of times equal to the number of times that the cursor control device 50 is clicked, until the magnification factor is equal to 1.

The inner region 102 also has a pan or positional feature within the outer region 106, such that the position of the inner region 102 within the outer region 106 represents the portion of the entire original image which is being displayed within the image display window 110. The position of the inner region 102 is changed within the outer region 106 by using the cursor control device 50 to click and drag the inner region 102 to the desired position within the outer region 106. Accordingly, the inner region 102 graphically represents what portion of the entire image is currently being displayed within the image display window 110 and what magnification factor 104 is currently being used to make this selected portion of the original image fit within the image display window 110.

The default or original state of the zoom control box 100 is illustrated in FIG. 2. In FIG. 2, the magnification factor 104 is equal to one (1) and the size and position of the inner region 102 represents that the entire original image is being displayed within the image display window 110. To increase the magnification at which the image is being displayed, and zoom in on a smaller portion of the original image, the user positions the cursor within the inner region 102 and clicks the cursor control device 50, thereby increasing the magnification factor 104 and decreasing the size of the inner region 102.

FIG. 3 illustrates an example wherein the magnification factor 104 within the zoom control box 100 has been increased to two (2), by using the cursor control device 50 to position the cursor within the inner region 102 and clicking the cursor control device 50. Also within the example of FIG. 3, the inner region 102 has been moved into the top left-hand corner of the outer region 106, by using the cursor control device 50 to click and drag the inner region 102 into that position within the outer region 106. As shown in FIG. 3, the top left-hand corner of the original image illustrated in FIG. 2, has been increased by a factor of two (2) and displayed in the image display window 110.

FIG. 4 illustrates an example wherein the image displayed within the image display window 110 represents a magnified image from the original image with a magnification factor of two (2). Within the example of FIG. 4, the inner region 102 has been moved into the lower right-hand corner of the outer region 106 using, the cursor control device 50 to click and drag the inner region 102 into that position within the outer region 106. As shown in FIG. 4, the lower right-hand corner of the original image illustrated in FIG. 2, has been increased by a factor of two (2) and displayed in the image display window 110.

To zoom in further on the original image, the user uses the cursor control device 50 to position the cursor within the inner region 102 and clicks, thereby increasing the magnification factor 104 and decreasing the relative size of the inner region 102. To zoom out to display more of the original image within the image display window 110, the user uses the cursor control device 50 to position the cursor outside of the inner region 102, but inside of the outer region 106 and clicks the cursor control device 50, thereby decreasing the magnification factor 104 and increasing the relative size of the inner region 102 until the magnification factor 104 is equal to one (1).

In this manner, the zoom control box 100 of the present invention provides a graphical representation of the magnification and representative portion of the original image being displayed within a corresponding image display window 110. It should be apparent to those skilled in the art that the zoom control box 100 of the present invention can be used to control the display of one or more still images, a series of one or more frames within a video stream, or the display of one or more graphics or text images. Using a cursor control device 50, the user can increase or decrease the magnification of the displayed image by appropriately positioning a cursor relative to the inner and outer regions, as described above, and clicking the cursor control device 50. Also using the cursor control device 50, the user can change the portion of the original image being displayed within the image display window 110 by changing the position of the inner region 102 within the outer region 106. The size and position of the inner region 102 relative to the outer region 106 graphically represents the magnification and representative portion of the original image being displayed within the image display window 110.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention includes inner and outer rectangular regions within the zoom control box, any appropriately shaped regions, including any graphics or bitmap defined shapes or areas, can be used to graphically represent the amount of magnification and portion of the original image being displayed within the image display window.

What is claimed is:

1. A graphical user interface for controlling a magnification of, and a portion of, an original image displayed within an image display window comprising:
   a. an outer region representing the original image; and
   b. an inner region positioned within the outer region,
      wherein a size of the inner region relative to the outer region represents the magnification of the original image being displayed within the image display window,
      wherein a position of the inner region within the outer region represents the portion of the original image being displayed within the image display window,
      wherein the size and position of the inner region relative to the outer region is changed in response to input commands, and
      wherein the size of the inner region is decreased when an input command is entered selecting the inner region.

2. The graphical user interface as claimed in claim 1 wherein the size of the inner region is increased when an input command is entered selecting the outer region.

3. The graphical user interface as claimed in claim 2 wherein the graphical user interface is displayed on a computer system having a display, a memory and an input device.

4. The graphical user interface as claimed in claim 3 wherein the input commands are entered using the input device and the inner and outer regions are selected by positioning a cursor within an appropriate region and clicking the input device.

5. The graphical user interface as claimed in claim 4 wherein the input device is a mouse.

6. A method of controlling a magnification of, and a portion of, an original image displayed within an image display window comprising the steps of:
   a. displaying a zoom control box including an inner region positioned within an outer region, wherein a size of the inner region relative to the outer region represents the magnification of the original image being displayed within the image display window and further wherein a position of the inner region within the outer region represents the portion of the original image being displayed within the image display window; and
   b. changing the size and position of the inner region in response to input commands;
wherein the size of the inner region is decreased when an input command is entered selecting the inner region.

7. The method as claimed in claim 6 wherein the size of the inner region is increased when an input command is entered selecting the outer region.

8. The method as claimed in claim 7 wherein the input commands are entered using a cursor control device and the inner and outer regions are selected by positioning a cursor within an appropriate region and clicking the cursor control device.

9. In a computer system having a display, a memory and an input device, a graphical user interface for controlling a magnification of, and a portion of, an original image displayed within an image display window comprising:
   a. an outer region representing the original image; and
   b. an inner region positioned within the outer region;
      wherein a size of the inner region relative to the outer region represents the magnification of the original image being displayed within the image display window,
      wherein a position of the inner region within the outer region represents the portion of the original image being displayed within the image display window,
      wherein the graphical user interface further comprises a magnification factor displayed within the inner region which numerically represents the magnification of the original image being displayed within the image display window, and
      wherein the size of the inner region is decreased and the magnification factor is increased when an input command is entered selecting the inner region and further wherein the size of the inner is increased and the magnification factor is decreased when an input command is entered selecting the outer region.

10. The computer system as claimed in claim 9 wherein the inner and outer regions are selected by positioning a cursor within an appropriate region and clicking the input device.

11. The computer system as claimed in claim 10 wherein the input device is a mouse.

12. The computer system as claimed in claim 11 wherein the computer system is further configured to receive the original image from an image source.

13. The computer system as claimed in claim 12 wherein the original image is a selective one of a still image and a frame within a video stream.

14. The method as claimed in claim 6 further comprising the step of receiving the original image from an image source.

15. The method as claimed in claim 6 wherein the original image is a still image.

16. The method as claimed in claim 6 wherein the original image is a frame within a video stream.

17. The graphical user interface of claim 1 wherein the inner region is rectangular.

18. The graphical user interface of claim 1 wherein the outer region is rectangular.

19. The graphical user interface of claim 1 wherein the device is a mouse.

20. The method of claim 6 further comprising the step of:
   c. receiving the original image from an image source.

21. The graphical user interface of claim 1 wherein the original image is received from an image source.

* * * * *